US008386786B2

(12) United States Patent
Irvine

(10) Patent No.: US 8,386,786 B2
(45) Date of Patent: Feb. 26, 2013

(54) FILE SYSTEM AUTHENTICATION

(76) Inventor: David Irvine, Ayrshire (GB)

(*) Notice: Subject to any disclaimer, the term of this patent is extended or adjusted under 35 U.S.C. 154(b) by 0 days.

(21) Appl. No.: 12/307,203

(22) PCT Filed: Jun. 11, 2007

(86) PCT No.: PCT/GB2007/002166
§ 371 (c)(1),
(2), (4) Date: Sep. 8, 2009

(87) PCT Pub. No.: WO2008/003923
PCT Pub. Date: Jan. 10, 2008

(65) Prior Publication Data
US 2010/0037060 A1 Feb. 11, 2010

(30) Foreign Application Priority Data

Jul. 4, 2006 (GB) .................................. 0613235.1

(51) Int. Cl.
*H04L 29/06* (2006.01)
*H04L 9/32* (2006.01)
*G06F 21/00* (2006.01)
*G06F 15/173* (2006.01)
*G06F 15/16* (2006.01)

(52) U.S. Cl. ........ 713/176; 713/152; 713/182; 709/225; 709/229

(58) Field of Classification Search .................. 713/182, 713/176; 726/28
See application file for complete search history.

(56) References Cited

U.S. PATENT DOCUMENTS

| 5,406,628 | A | 4/1995 | Beller et al. |
| 5,481,720 | A * | 1/1996 | Loucks et al. .................. 726/21 |
| 6,230,269 | B1 * | 5/2001 | Spies et al. ..................... 713/182 |
| 2003/0065777 | A1 * | 4/2003 | Mattila et al. ................. 709/225 |
| 2003/0217288 | A1 * | 11/2003 | Guo et al. ...................... 713/201 |
| 2004/0054885 | A1 * | 3/2004 | Bartram et al. ............... 713/152 |
| 2006/0206616 | A1 * | 9/2006 | Brown .......................... 709/229 |
| 2006/0277092 | A1 * | 12/2006 | Williams ....................... 705/10 |

FOREIGN PATENT DOCUMENTS

| WO | WO 95/24698 | 9/1995 |
| WO | WO 01/11817 | 2/2001 |
| WO | WO 01/13201 | 2/2001 |

OTHER PUBLICATIONS

Bharghavan, Vaduvur, "Secure Wireless LANS", In Proceedings of the ACM Conference on Computers and Communications Security, 1994.
Abstract-Kwon, et al, "Authenticated key exchange protocols resistant to password guessing attacks", IEE Proceedings, Communications, Oct. 1998, vol. 45, Issue 5, pp. 304-308.

* cited by examiner

*Primary Examiner* — Shin-Hon Chen
(74) *Attorney, Agent, or Firm* — Dickinson Wright

(57) ABSTRACT

The present invention relates to file system authentication and, in particular, authentication of users for accessing files stored on a serverless distributed or peer-to-peer file system. Its objective is to preserve the anonymity of the users and to provide secure and private storage of data for users on a serverless distributed file system. It provides a method of authenticating access to a distributed file system comprising the steps of; receiving a user identifier; retrieving an encrypted validation record identified by the user identifier; decrypting the encrypted validation record so as to provide decrypted information; and authenticating access to data in the distributed file system using the decrypted information.

14 Claims, 2 Drawing Sheets

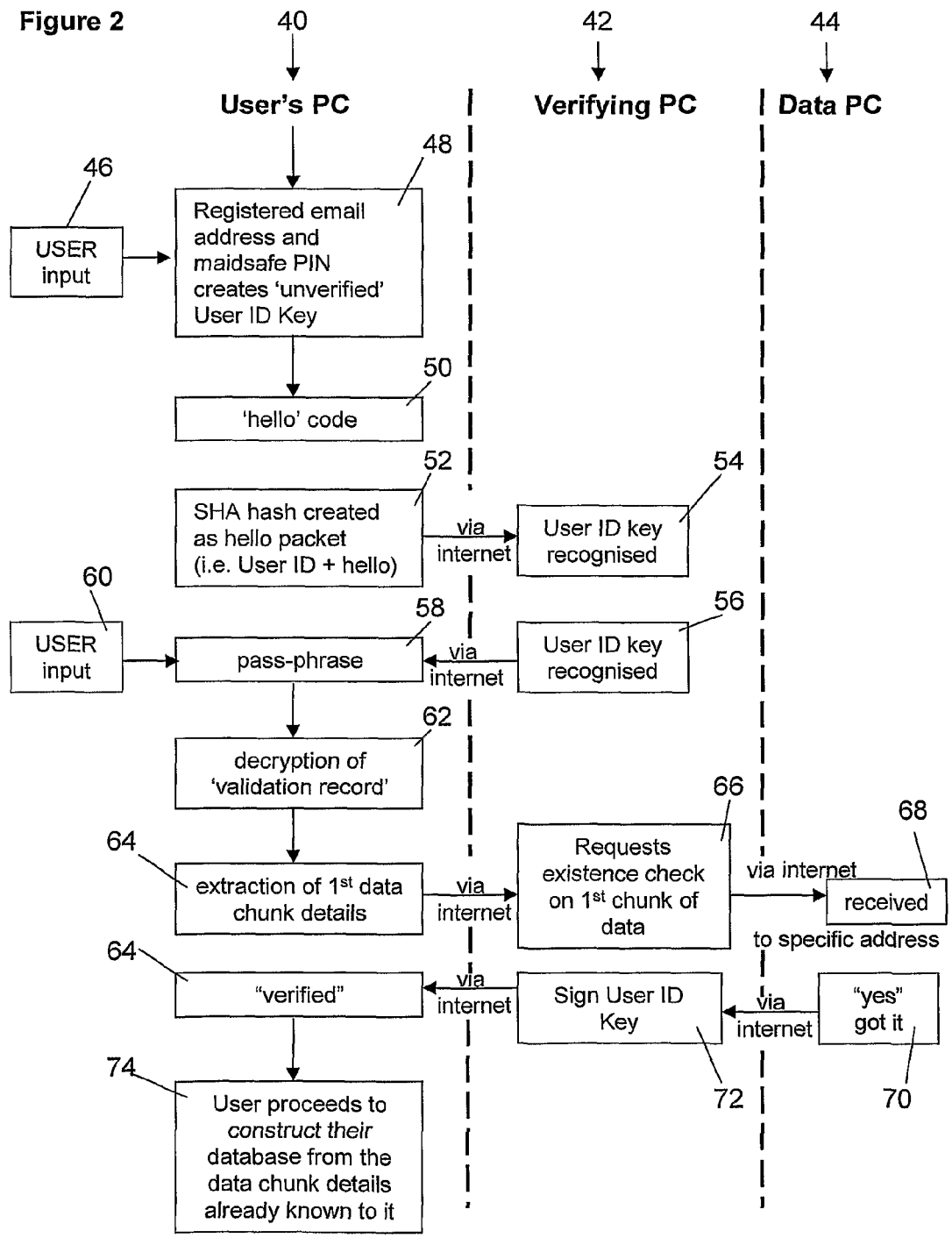

FILE SYSTEM AUTHENTICATION

CROSS REFERENCE TO RELATED APPLICATIONS

Figure 1:
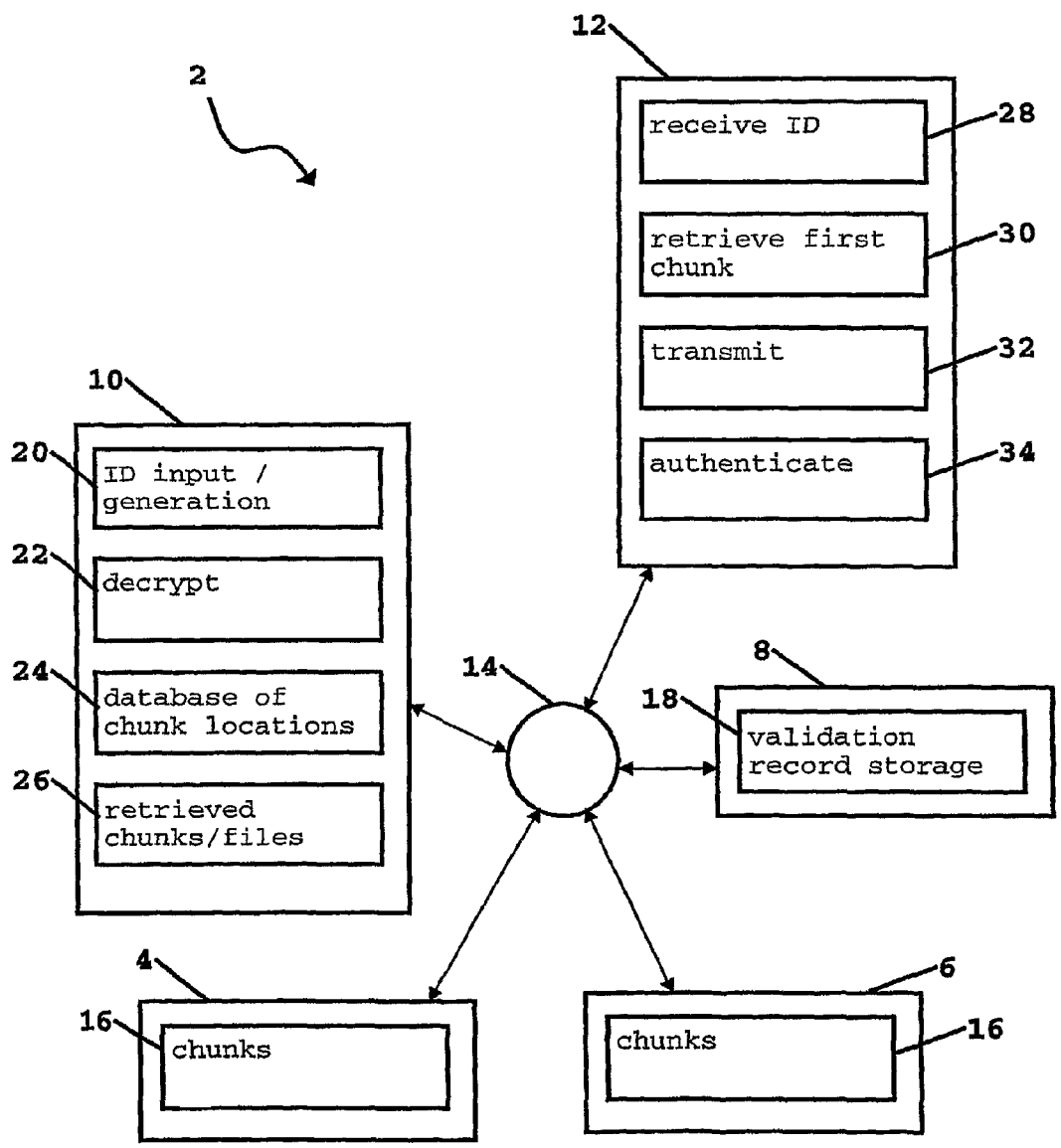

The present application is a 35 U.S.C. §371 national stage filing of International Patent Application No. PCT/GB2007/002166, filed Jun. 11, 2007, and through which priority is claimed to Great Britain Patent Application No. 0613235.1, filed Jul. 4, 2006.

The present invention relates to file system authentication and, in particular, authentication of users for accessing files stored on a distributed or peer-to-peer file system.

Distributed file systems have advantages over traditional centralised file systems including improved fault tolerance, availability, scalability and performance.

A problem with known distributed file systems is that the anonymity of a user can be compromised because the user's password is stored on a server on a network and is transmitted over the network after entry by the user. This provides an opportunity for the password to be intercepted and used for unauthorised access to the files distributed across the distributed file system.

Another problem with known distributed file systems is that information about the location of files is stored on the network. This provides more opportunity for an unauthorised user to use the information to identify the location of files, or chunks of files, in order to gain unauthorised access to the files distributed across the peer-to-peer file system.

It is an object of the present invention to preserve the anonymity of the users and to provide secure and private storage of data for users on a distributed file system.

According to a first aspect of the present invention there is provided a method of authenticating access to a distributed file system comprising the steps of;
 receiving a user identifier;
 retrieving an encrypted validation record identified by the user identifier;
 decrypting the encrypted validation record so as to provide decrypted information; and
 authenticating access to data in the distributed file system using the decrypted information.

Preferably the steps of receiving, retrieving and authenticating are performed on a node in the distributed file system separate from a node performing the step of decrypting.

Preferably, the method further comprises the step of generating the user identifier using a hash.

Therefore, the user identifier is unique and suitable for identifying unique validation records.

Preferably, the step of authenticating access further comprises the step of digitally signing the user identifier.

This provides authentication that can be validated against trusted authorities.

Preferably, the method further comprises the step of using the signed user identifier as a session passport to authenticate a plurality of accesses to the distributed file system.

This allows persistence of the authentication for an extended session.

Preferably, the step of decrypting comprises decrypting an address in the distributed file system of a first chunk of data and the step of authenticating access further comprises the step of determining the existence of the first chunk at the address.

This efficiently combines the tasks of authentication and starting to retrieving the data from the system.

Preferably, the method further comprises the step of using the content of the first chunk to obtain further chunks from the distributed file system.

Therefore, there is no need to have a potentially vulnerable record of the file structure persisting in one place on the distributed file system, as the user's node constructs its database of file locations after logging onto the system.

According to a second aspect of the present invention there is provided a distributed file system comprising;
 a storage module adapted to store an encrypted validation record;
 a client node comprising a decryption module adapted to decrypt an encrypted validation record so as to provide decrypted information; and
 a verifying node comprising:
  a receiving module adapted to receive a user identifier;
  a retrieving module adapted to retrieve from the storage module an encrypted validation record identified by the user identifier;
  a transmitting module adapted to transmit the encrypted validation record to the client node; and
  an authentication module adapted to authenticate access to data in the distributed file system using the decrypted information from the client node.

Preferably, the client node is further adapted to generate the user identifier using a hash.

Preferably, the authentication module is further adapted to authenticate access by digitally sign the user identifier.

Preferably, the signed user identifier is used as a session passport to authenticate a plurality of accesses by the client node to the distributed file system.

Preferably, the decryption module is further adapted to decrypt an address in the distributed file system of a first chunk of data from the validation record and the authentication module is further adapted to authenticate access by determining the existence of the first chunk at the address.

Preferably, the client node is further adapted to use the content of the first chunk to obtain further chunks from the distributed file system.

According to a third aspect of the present invention there is provided at least one computer program comprising program instructions for causing at least one computer to perform the method according to the first aspect.

Preferably the at least one computer program is embodied on a recording medium or read-only memory, stored in at least one computer memory, or carried on an electrical carrier signal.

The present invention will now be described by way of example only with reference to the accompanying figures, in which:

FIG. 1 illustrates, in schematic form, a peer-to-peer network in accordance with an embodiment of the invention; and FIG. 2 illustrates a flow chart of the authentication, in accordance with a preferred embodiment of the present invention.

With reference to FIG. 1, a peer-to-peer network 2 is shown with nodes 4, 6, 8, 10 and 12 connected by a communication network 14. The nodes may be Personal Computers (PCs) or any other device that can perform the processing, communication and/or storage operations required to operate the invention. The file system will typically have many more nodes of all types than shown in FIG. 1 and a PC may act as one or many types of node described herein. Data nodes 4 and 6 store chunks 16 of files in the distributed file system. The validation record node 8 has a storage module 18 for storing encrypted validation records identified by a user identifier.

The client node 10 has a module 20 for input and generation of user identifiers. It also has a decryption module 22 for decrypting an encrypted validation record so as to provide decrypted information, a database of chunk locations 24 and storage 26 for retrieved chunks and files assembled from the retrieved chunks.

The verifying node 12 has a receiving module 28 for receiving a user identifier from the client node. The retrieving module 30 is configured to retrieve from the data node an encrypted validation record identified by the user identifier. Alternatively, in the preferred embodiment, the validation record node 8 is the same node as the verifying node 12, i.e. the storage module 18 is part of the verifying node 12 (not as shown in FIG. 1). The transmitting module 32 sends the encrypted validation record to the client node. The authentication module 34 authenticates access to chunks of data distributed across the data nodes using the decrypted information.

With reference to FIG. 2, a more detailed flow of the operation of the present invention is shown laid out on the diagram with the steps being performed at the User's PC (client node) on the left 40, those of the verifying PC (node) in the centre 42 and those of the data PC (node) on the right 44.

A login box is presented 46 that requires the user's email address (the same one used in the client node software installation and registration process) and the user's PIN number. If the user is a 'main user' then some details may already be stored on the PC. If the user is a visitor, then the login box appears.

A content hashed number such as SHA (Secure Hash Algorithm), 160 bits in length, is created 48 from these two items of data. This 'hash' is now known as the 'User ID Key', which at this point is classed as 'unverified' within the system.

The software on the user's PC then combines this unverified User ID Key with a standard 'hello' code element 50, to create 52 a 'hello.packet'. This hello.packet is then transmitted with a timed validity on the Internet.

The hello.packet will be picked up by the first node (for this description, now called the 'verifying node') that recognises 54 the User ID Key element of the hello.packet as matching a stored, encrypted validation record file 56 that it has in its storage area. A login attempt monitoring system ensures a maximum of three responses. Upon too many attempts, the verifying PC creates a 'black list' for transmission to peers. Optionally, an alert is returned to the user if a 'black list' entry is found and the user may be asked to proceed or perform a virus check.

The verifying node then returns this encrypted validation record file to the user via the internet. The user's pass phrase 58 is requested by a dialog box 60, which then will allow decryption of this validation record file.

When the validation record file is decrypted 62, the first data chunk details, including a 'decrypted address', are extracted 64 and the user PC sends back a request 66 to the verifying node for it to initiate a query for the first 'file-chunk ID' at the 'decrypted address' that it has extracted from the decrypted validation record file.

The verifying node then acts as a 'relay node' and initiates a 'notify only' query for this 'file-chunk ID' at the 'decrypted address'.

Given that some other node (for this embodiment, called the 'data node') has recognised 68 this request and has sent back a valid 'notification only' message 70 that a 'file-chunk ID' corresponding to the request sent by the verifying node does indeed exist, the verifying node then digitally signs 72 the initial User ID Key, which is then sent back to the user.

On reception by the user 74, this verified User ID Key is used as the user's session passport. The user's PC proceeds to construct 76 the database of the file system as backed up by the user onto the network. This database describes the location of all chunks that make up the user's file system.

Further details of the embodiment will now be described. A 'proxy-controlled' handshake routine is employed through an encrypted point-to-point channel, to ensure only authorised access by the legal owner to the system, then to the user's file storage database, then to the files therein. The handshaking check is initiated from the PC that a user logs on to (the 'User PC'), by generating the 'unverified encrypted hash' known as the 'User ID Key', this preferably being created from the user's registered email address and their PIN number. This 'hash' is transmitted as a 'hello.packet' on the Internet, to be picked up by any system that recognises the User ID as being associated with specific data that it holds. This PC then becomes the 'verifying PC' and will initially act as the User PC's 'gateway' into the system during the authentication process. The encrypted item of data held by the verifying PC will temporarily be used as a 'validation record', it being directly associated with the user's identity and holding the specific address of a number of data chunks belonging to the user and which are located elsewhere in the peer-to-peer distributed file system. This 'validation record' is returned to the User PC for decryption, with the expectation that only the legal user can supply the specific information that will allow its accurate decryption.

After successful decryption, the User PC extracts the address and name of the first data chunk from the verification record and passes this back to the verifying PC with a request to check the existence of this 'data chunk' on the specifically addressed PC. On the event of a positive response from a 'data PC' to this 'data access test', the verifying PC signs the User ID Key and passes it back to the User PC. This action is notification to the User PC that the user can then proceed with full access rights to the system, whereupon the first action is to retrieve the user's personal database.

It should be noted that in this embodiment, no communication is carried out via any nodes without an encrypted channel such as TLS (Transport Layer Security) or SSL (Secure Sockets Layer) being set up first. A peer talks to another peer via an encrypted channel and the other peer (proxy) requests the information (e.g. for some space to save information on or for the retrieval of a file). An encrypted link is formed between all peers at each end of communications and also through the proxy during the authentication process. This effectively bans snoopers from detecting who is talking to whom and also what is being sent or retrieved. The initial handshake for self authentication is also over an encrypted link.

Secure connection is provided via certificate passing nodes, in a manner that does not require intervention, with each node being validated by another, where any invalid event or data, for whatever reason (fraud detection, snooping from node or any invalid algorithms that catch the node) will invalidate the chain created by the node. This is all transparent to the user.

Further modifications and improvements may be added without departing from the scope of the invention herein described.

The invention claimed is:
1. A method of authenticating access to a distributed file serverless system comprising the steps of:
  transmitting a user identifier from a first node to a plurality of nodes of the distributed file serverless system;

adapting one of the plurality of nodes to act as a verifying node, the node which is adapted depending on the user identifier;

receiving the transmitted user identifier at the verifying node;

retrieving an encrypted validation record identified by the user identifier;

decrypting the encrypted validation record so as to provide decrypted information; and authenticating access to data in the distributed file serverless system using the decrypted information;

wherein the steps of receiving, retrieving and authenticating are performed on a node in the distributed file serverless system that is separate from a node performing the step of decrypting; and wherein said nodes comprise machine components in the distributed file serverless system.

2. The method of claim 1, wherein the method further comprises the step of generating the user identifier using a hash.

3. The method of claim 1, wherein the user identifier is unique and suitable for identifying unique validation records.

4. The method of claim 1, wherein the step of authenticating access further comprises the step of digitally signing the user identifier, and wherein said step of digitally signing the user identifier is carried out by the verifying node.

5. The method of claim 4, wherein the method further comprises the step of using the signed user identifier as a session passport to authenticate a plurality of accesses to the distributed file serverless system.

6. The method of claim 1, wherein the step of decrypting comprises decrypting an address in the distributed file serverless system of a first chunk of data, and the step of authenticating access further comprises the step of determining the existence of the first chunk of data at the address.

7. The method of claim 6, wherein the method further comprises the step of using the content of the first chunk of data to obtain further chunks of data from the distributed file serverless system.

8. The method of claim 1, wherein the step of decrypting the encrypted validation record so as to provide decrypted information is carried out by the first node.

9. A distributed file serverless system comprising:

a storage module adapted to store an encrypted validation record;

a client node comprising a decryption module adapted to decrypt an encrypted validation record so as to provide decrypted information; and a plurality of nodes that are separate from the client node, each of the plurality of nodes comprising:

a receiving module adapted to receive a user identifier;

a retrieving module adapted to retrieve from the storage module an encrypted validation record identified by the user identifier;

a transmitting module adapted to transmit the encrypted validation record to the client node; and an authentication module adapted to authenticate access to data in the distributed file system using the decrypted information from the client node;

wherein any one of the said plurality of nodes of the distributed serverless system is adaptable to act as a verifying node depending on the user identifier received by the receiving module; and wherein said nodes comprise machine components in the distributed file serverless system.

10. The distributed file system of claim 9, wherein the client node is further adapted to generate the user identifier using a hash.

11. The distributed file system of claim 9, wherein the authentication module is further adapted to authenticate access by digitally signing the user identifier.

12. The distributed file system of claim 11, wherein the signed user identifier is used as a session passport to authenticate a plurality of accesses by the client node to the distributed file system.

13. The distributed file system of claim 9, wherein the decryption module is further adapted to decrypt an address in the distributed file system of a first chunk of data from the validation record, and the authentication module is further adapted to authenticate access by determining the existence of the first chunk of data at the address.

14. The distributed file system of claim 13, wherein the client node is further adapted to use the content of the first chunk of data to obtain further chunks of data from the distributed file system.

* * * * *